US010608955B2

(12) United States Patent
Lu et al.

(10) Patent No.: US 10,608,955 B2
(45) Date of Patent: *Mar. 31, 2020

(54) REVERSE BREADTH-FIRST SEARCH METHOD FOR OPTIMIZING NETWORK TRAFFIC IN A DISTRIBUTED SYSTEM WITH A POINT OF CONVERGENCE

(71) Applicant: VMware, Inc., Palo Alto, CA (US)

(72) Inventors: Sheng Lu, Beijing (CN); Leonid Vasetsky, Zichron Yakov (IL); Ming Chen, Beijing (CN); Zhikai Chen, Beijing (CN); Kan Liu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 14/553,377

(22) Filed: Nov. 25, 2014

(65) Prior Publication Data

US 2016/0149829 A1 May 26, 2016

(51) Int. Cl.
 *H04L 12/911* (2013.01)
 *H04L 12/801* (2013.01)
 (Continued)

(52) U.S. Cl.
 CPC ........ *H04L 47/783* (2013.01); *H04L 41/0896* (2013.01); *H04L 41/12* (2013.01);
 (Continued)

(58) Field of Classification Search
 CPC ........ H04L 45/48; H04L 45/02; H04L 41/12; H04L 47/11; H04L 45/125; H04L 41/0896; H04L 45/38; G06F 3/0613
 (Continued)

(56) References Cited

U.S. PATENT DOCUMENTS 6,400,681 B1 * 6/2002 Bertin ................... H04L 49/205
370/218
6,721,270 B1 4/2004 Mitra et al.
(Continued)

FOREIGN PATENT DOCUMENTS

WO WO 2013109137 A1 * 7/2013 ............ H04W 28/16
WO WO 2014088394 A2 * 6/2014 ............ H04W 16/08

OTHER PUBLICATIONS

Dong et al—Throughput Optimization and Fair Bandwidth Allocation in Multi-hop Wireless LANs—IEEE—Infocom 2006, 25th IEEE International Conference on Computer Communication, Apr. 2006 (pp. 1-13).*

(Continued)

*Primary Examiner* — Wing F Chan
*Assistant Examiner* — Ishrat Rashid
(74) *Attorney, Agent, or Firm* — Patterson + Sheridan, LLP

(57) ABSTRACT

Techniques are disclosed herein for managing network bandwidth in a distributed system having multiple endpoints that upload data to a central server or server cluster. One embodiment provides a computer-implemented method that includes receiving a logical topology of the network that is determined based on network measurements. The method further includes generating a tree having links of the logical network topology as nodes, and allocating bandwidth during a traversal of the tree to obtain a bandwidth allocation scheme for the endpoints uploading data. In addition, the method includes controlling bandwidth consumption by the endpoints based on the determined bandwidth allocation scheme.

17 Claims, 6 Drawing Sheets

(51) Int. Cl.
*H04L 12/919* (2013.01)
*H04L 12/24* (2006.01)
*H04L 12/26* (2006.01)

(52) U.S. Cl.
CPC ............ *H04L 47/35* (2013.01); *H04L 47/765* (2013.01); *H04L 43/026* (2013.01); *H04L 43/0894* (2013.01)

(58) Field of Classification Search
USPC .................. 370/235, 229, 256; 709/203, 226
See application file for complete search history.

(56) References Cited

U.S. PATENT DOCUMENTS

| | | | |
|---|---|---|---|
| 7,072,295 B1* | 7/2006 | Benson | H04L 12/5963 370/230 |
| 8,467,354 B1 | 6/2013 | Jerkunica et al. | |
| 9,003,364 B2* | 4/2015 | Dutta | G06G 17/5072 716/11 |
| 9,325,585 B1* | 4/2016 | Wang | H04L 41/5067 |
| 2003/0072327 A1 | 4/2003 | Fodor et al. | |
| 2004/0218529 A1 | 11/2004 | Rodosek et al. | |
| 2004/0246905 A1* | 12/2004 | Dunagan | H04L 45/02 370/252 |
| 2005/0030902 A1* | 2/2005 | Choi | H04L 12/40097 370/252 |
| 2005/0157646 A1* | 7/2005 | Addagatla | H04L 47/10 370/232 |
| 2005/0201285 A1 | 9/2005 | Simonis | |
| 2007/0041317 A1* | 2/2007 | Haley | H04L 41/12 370/229 |
| 2007/0043131 A1* | 2/2007 | Haley | H04L 41/12 370/22 |
| 2007/0177506 A1 | 8/2007 | Singer et al. | |
| 2008/0008116 A1 | 1/2008 | Buga et al. | |
| 2009/0059793 A1 | 3/2009 | Greenberg | |
| 2009/0292482 A1* | 11/2009 | Frumkin | G06F 19/18 702/2 |
| 2009/0292793 A1 | 11/2009 | Jiang et al. | |
| 2010/0082838 A1 | 4/2010 | Wang et al. | |
| 2010/0150004 A1 | 6/2010 | Duffield et al. | |
| 2010/0262574 A1 | 10/2010 | Zhou | |
| 2010/0302935 A1 | 12/2010 | Zhang et al. | |
| 2012/0195209 A1* | 8/2012 | Jain | H04L 41/0896 370/252 |
| 2013/0007264 A1 | 1/2013 | Effros et al. | |
| 2013/0205002 A1 | 8/2013 | Wang et al. | |
| 2014/0269280 A1 | 9/2014 | Bhanage et al. | |
| 2016/0028632 A1 | 1/2016 | Vasseur et al. | |
| 2016/0028637 A1 | 1/2016 | Vasseur et al. | |
| 2016/0043925 A1 | 2/2016 | Rodbro et al. | |
| 2016/0080207 A1* | 3/2016 | Prakash | H04L 69/16 370/23 |
| 2016/0149831 A1 | 5/2016 | Lu et al. | |

OTHER PUBLICATIONS

Robert I. Pitts—"Breadth-First Traversal of a Tree" 1993-2000.*
Office Action dated Oct. 6, 2016 for application No. 14553241.
Office Action dated Oct. 12, 2016 for application No. 14553306.
U.S. Office Action dated Oct. 6, 2016, mailed in U.S. Appl. No. 14/553,241, 34 pages.
U.S. Office Action dated Feb. 2, 2018, mailed in U.S. Appl. No. 14/553,241, 36 pages.
U.S. Final Office Action dated May 8, 2017, mailed in U.S. Appl. No. 14/553,241, 27 pages.
Boyd, S., et al, "Convex Optimization", Cambridge University Press. ISBN 978-0-521-83378-3, (2004).
Convex optimization, [Retrieved on Jul. 24, 2015]. Retrieved from the Internet: <http://en.wikipedia.org/wiki/Convex_optimization, Wikipedia>.
Fayolle, G., et al., "Best effort networks: modeling and performance analysis via large network asymptotics", Proceeings of 20 IEEE INFOCOM, (2001).
Floyd, S., et al., "Promoting the use of end-to-end congestion control in the Internet", IEEE/ACM Transactions on Networking 7 pp. 458-472, (1999).
Kelly, F., et al., "Rate control for communication networks: shadow price proportional fairness and stability", Journal of the Operational Research Society 29, pp. 237-252, (1998).
Mo. J., et al., "Fair end-to-end window-based congestion control", IEEE/ACM Transaction on Networking 8(5) pp. 556-567, (2000).
Tang, A., et al., "Is fair allocation always inefficient", Proceedings of IEEE INFOCOM '04 pp. 35-45, (2004).
Zukerman, M., et al., "Efficiency-Fairness tradeoff in telecommunications networks", IEEE communications Letters 9 (7) pp. 643-645, (2005).

* cited by examiner

REVERSE BREADTH-FIRST SEARCH METHOD FOR OPTIMIZING NETWORK TRAFFIC IN A DISTRIBUTED SYSTEM WITH A POINT OF CONVERGENCE

CROSS-REFERENCE TO RELATED APPLICATIONS

This application is related to the patent applications entitled "Method and System for Optimizing Network Traffic in a Distributed System with a Point of Convergence" Ser. No. 14/553,241 and "Resolving a Convex Optimization Problem to Optimize Network Traffic in a Distributed System" Ser. No. 14/535,306, all of which are assigned to the assignee of this application and have been filed on the same day as this application.

BACKGROUND

Many algorithms and protocols have been developed to avoid congestion and control bandwidth consumption in networks. In particular, techniques are known for bandwidth management and allocation in large scale distributed systems where data is (mostly) transmitted downstream from a central server to multiple endpoints. For example, traditional web servers and file distribution servers use such techniques as proxy-based caching and content delivery networks (CDNs) to transmit data downstream.

The opposite problem of managing and allocating bandwidth in a system characterized by frequent and large uploads from distributed endpoints to a central server has not often been explored. This problem becomes more complex if the endpoints in the system are scattered over a wide area network (WAN) or the Internet and the network between the endpoints and the server cannot be controlled by applying quality of service (QoS) policies. One example of such a system is the commercially available Horizon Mirage™, by VMware® of Palo Alto, Calif. Mirage is a system for managing and deploying endpoint images that are managed in a central server, but executing workloads locally on user devices for optimal user experience. For example, a traveling employee may deploy an image of the employee's office desktop onto a local machine and execute the workload therein. Mirage frequently synchronizes a snapshot of the endpoint image, on the local machine, with the central server. Doing so "saves" changes the user makes on the server and provides continuous data protection.

Traditionally, to optimize bandwidth usage when multiple endpoints are synchronizing with a central server, each endpoint determines independently whether the network appears congested and whether it should throttle its own uploading. Such independent determination by client devices is a suboptimal solution for managing overall bandwidth usage.

SUMMARY

One embodiment of the present disclosure provides a computer-implemented method for managing network bandwidth in a distributed system having multiple endpoints that upload data to a central server or server cluster. The method generally includes receiving a logical topology of the network that is determined based on network measurements. The method further includes generating a tree having links of the logical network topology as nodes, and allocating bandwidth during a traversal of the tree to obtain a bandwidth allocation scheme for the endpoints uploading data. In addition, the method includes controlling bandwidth consumption by the endpoints based on the determined bandwidth allocation scheme.

Further embodiments of the present invention include, without limitation, a non-transitory computer-readable storage medium that includes instructions that enable a computer system to implement one or more aspects of the above methods, as well as a computer system configured to implement one or more aspects of the above methods.

DETAILED DESCRIPTION

Embodiments presented herein provide techniques for optimizing network traffic in a distributed system with a point of convergence. The distributed system may be characterized by frequent and/or large uploads from distributed endpoints to a central server (the point of convergence), e.g., to a Horizon Mirage™ server. Although discussed herein primarily with respect to a single central server, it should be understood that techniques disclosed herein are also applicable to distributed systems in which endpoints upload to a cluster of servers, e.g., when the central server is scaled out with many homogeneous servers. To optimize network traffic in such a distributed system, a bandwidth management application running in the central server collects network measurement data. The network measurement data may be collected using packets ordinarily transmitted from the endpoints to the central server, without the need to flood the network to manipulate the time to live (TTL). Using the network measurement data, the bandwidth management application identifies network bottlenecks shared by the endpoints, and determines a logical topology of the network based on the bottlenecks. The bandwidth management application further measures capacity of available bandwidth for each link in the logical topology, including effective endpoint bandwidth and effective branch, etc.

To optimize bandwidth allocation, the bandwidth management application solves an optimization problem with the bandwidth capacity of the links as constraints. The optimization problem may be formulated in a number of ways, with different tradeoffs between efficiency and fairness. In one embodiment, the bandwidth management application may solve a convex optimization problem to find the minimum (or maximum) of a utility function. In another embodiment, the bandwidth management application may use a reverse breadth-first search (BFS) tree traversal algorithm to traverse the logical topology and allocate bandwidth to achieve max-min fairness of bandwidth, in which any attempt to increase the allocation of bandwidth to a link results in the decrease in the allocation to another link with an equal or smaller allocation. After determining an optimal bandwidth allocation, the bandwidth management application may take appropriate bandwidth control actions according to the allocation, such as causing one or more endpoints to throttle their rate of uploading.

Figure 1:
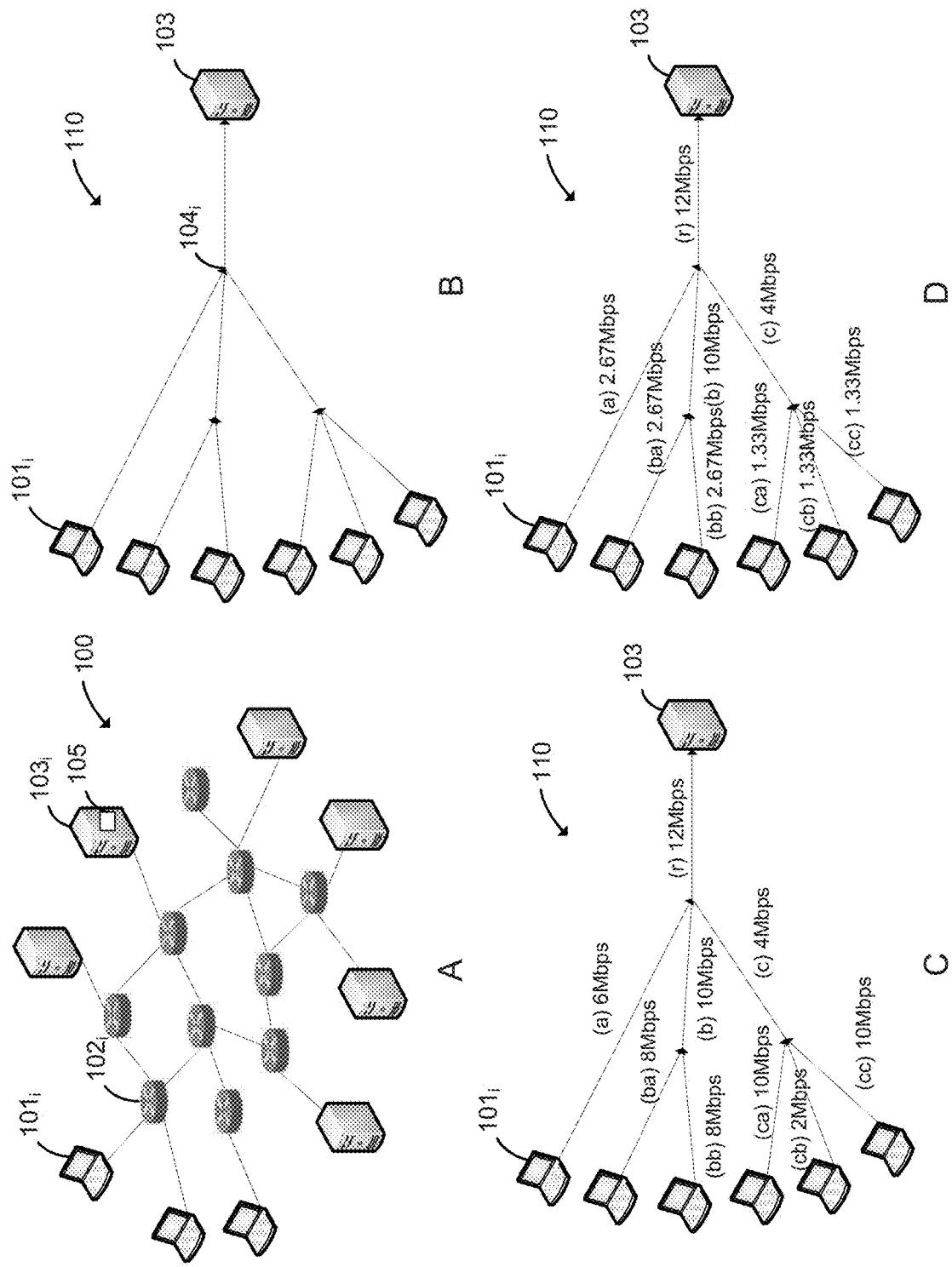
FIG. 1 illustrates an approach for network bandwidth optimization, according to an embodiment.

FIG. 1 illustrates an approach for network bandwidth optimization, according to an embodiment. Panel A shows an example of a physical network topology 100. In physical network topology 100, a plurality of client devices $101_i$ are connected to one or more servers $103_i$ via one or more routers $102_i$. In a distributed system with a point of convergence, multiple client devices $101_i$ are configured to upload data to a single server $103_i$ (or a few such servers). Hence, each server $103_i$ may be referred to herein as a "central server $103_i$". Central server $103_i$ is a convergence point, where traffic flows come together. Embodiments disclosed herein make use of the fact that overall information about traffic flows is available at central server $103_i$ by taking network measurements at central server $103_i$ and controlling bandwidth allocation at central server $103_i$ to achieve efficiency, fairness, or some combination thereof. Efficiency can be defined in terms of average mission complete time, e.g., the average time required to upload a given amount of data from the client devices $101_i$, but efficiency can also be defined based on other criteria as well. Fairness is most commonly defined in terms of max-min fairness, in which no participant (e.g., client devices $101_i$) is able to gain resources by taking resources (e.g., bandwidth) from other participants who have equal or less resources. In a single resource pool, the even distribution is max-min fair, but, in some hierarchical structures, a branch may have less resources in total.

Panel B illustrates an example of a logical tree-style topology 110 estimated from network measurement data taken by a central server 103. Such a logical topology 110 may be recalculated, e.g., each time an endpoint disconnects, at regular scheduled intervals, etc. As shown, logical topology 110 includes links between central server 103 itself, client devices $101_i$, and network bottlenecks $104_i$. In general, each link is a channel, or hop, between two or more network devices. In the application layer, a link may be an end-to-end connection between two endpoints. In a router, a link may be described by a network interface linked with other routers. Although a single central server 103 is shown, client devices $101_i$ may generally upload data to multiple central servers. In such a case, the multiple central servers may make network measurements and provide the network measurements to a single central server, which is responsible for determining logical topology 110 and optimizing and controlling bandwidth allocation.

Physical network topology 100 may be complex, with arbitrary circles, stars, backup links, and the like. However, for purposes of optimizing uploading bandwidth allocation, it is not necessary to know physical network topology 100 exactly. Instead, a bandwidth management application 105 executing in central server 103 estimates logical topology 110 that may treat multiple routers as a single link for bottleneck computation purposes. Note that logical topology 110 is unidirectional, as only the upstream direction to the convergence point needs to be considered.

In one embodiment, bandwidth management application 105 running in central server 103 may generate logical topology 110 by comparing network measurements made for each pair of client devices $101_i$ to identify whether the pair of client devices $101_i$ share a bottleneck $104_i$. In particular, bandwidth management application 105 may (1) measure effective bandwidths for each endpoint, and (2) identify shared bottlenecks. In one embodiment, "Packet Bunch Modes" may be used to measure effective bandwidths of endpoints. Large back-to-back packets that are sent may be detected by bandwidth management application 105 at the receiving side, and bandwidth management application 105 may use the time interval between the packets to calculate the bandwidth of the narrowest link, and thus effective bandwidth available for the endpoint. It has been shown that the lower bound of capacity and upper bound of available bandwidth may be deduced using such an approach.

To identify shared bottlenecks, bandwidth management application 105 may compare network measurements for pairs of endpoints. As discussed, the network measurements may include Packet Bunch Mode measurements, such as Packet Train Mode measurements. As is known, short-scale stochastic attributes of traffic are similar to longer scale statistical properties due to the self-similarity nature of network traffic. Further, studies have shown that there are strong correlations in sub-RTT (round trip time) scales of self-clocking and correlations between a single flow and the aggregation of many flows. Bandwidth management application 105 may make use of these properties by measuring the arrival of uploaded data to obtain stochastic traffic attributes for each client device $101_i$, and then comparing the stochastic traffic attributes of pairs of client devices $101_i$ to identify shared bottlenecks $104_i$.

In one embodiment, bandwidth management application 105 may count the arrival times of packets in the traffic flows from the client devices $101_i$ as the packets are received. In particular, Bandwidth management application 105 may calculate mean, variance, and (optionally) other stochastic attributes for the traffic flows. By independently calculating stochastic attributes for two traffic flows active in the same period, bandwidth management application 105 is able determine if the flows are in the same distribution. Bandwidth management application 105 may then assume that two traffic flows in the same distribution share the same bottleneck. By thus identifying bottlenecks in the network, bandwidth management application 105 can build the overall logical topology 110 through a recursively process, discussed in greater detail below with respect to FIG. 2. It should be understood, however, that other techniques for building logical topology 110 may also be employed.

Panel C illustrates an example of the capacity of available bandwidth for each link in logical topology 110. As discussed, each link corresponds to a bottleneck, and the capacity of available bandwidth is simply the capacity of the bottleneck. As shown, the nine links of logical topology 110 are labeled as (a), (ba), (bb), (b), (ca), (cb), (cc), (c), and (r), where (b) is the parent of (ba) and (bb) and (c) is the parent of (ca), (cb), and (cc). As shown, the links have the following capacity of available bandwidth: (a): 6 Mbps, (b): 10 Mbps, (c): 4 Mbps, (ba): 8 Mbps, (bb): 8 Mbps, (ca): 10 Mbps, (cb): 2 Mbps, (cc): 10 Mbps, (R): 12 Mbps.

Panel D illustrates an example of an optimized bandwidth allocation for logical topology 110. It should be understood that bandwidth allocation may be optimized in various ways to achieve some desired combination of efficiency and/or fairness. Two examples of bandwidth allocation optimization are described below. However, techniques disclosed herein are not limited to these optimization algorithms.

In one embodiment, bandwidth management application 105 may solve a convex optimization problem to optimize the bandwidth allocation across client devices $101_i$ (referred to below as "endpoints"). In particular, the convex optimization problem may find an optimized set of $X_i$ (rate of flow i) to maximize utilization of each link in the path. Assume there are J links in the network with link $j \in J$, and I endpoints in the network with each endpoint $i \in I$. Each endpoint i maps to at least one router r, where r∈J. For each r of a given endpoint i, define $A_{ij}=1$ if j∈r and $A_{ij}=0$ otherwise. Doing so gives a 0-1 matrix A. Let the consumed bandwidth of traffic flow for endpoint i be $X_i$ so that the bandwidth of all flows can be written as the vector $X=\{X_1, X_2, \ldots, X_{[I]}\}$. For each link j, let $C_j$ be the available bandwidth for that link, forming the vector for all available bandwidths $C=\{C_1, C_2, \ldots, C_{[J]}\}$. The optimization problem should then be subject to XA≤C, over $X_i \geq 0$.

Under the convex optimization approach, a utility function $U(X_i)$ should be defined for each flow i. In one embodiment, the utility function may be defined based on the notion of efficiency and may assume that workloads for each point is known. In general, bottleneck bandwidth capacity, workload, connectivity, and time are some of the factors that may be used in optimization. Assuming that the total length of each task is known before the task is started, and letting the total task workload for a given endpoint i be defined as $W_i$, where $W=\{W_1, W_2, \ldots, W_{[I]}\}$, then the utility function may taken as, for example:

$$U(X_i) = \frac{W_i}{X_i}.$$

In this example, the consumed bandwidth for endpoint i, namely $X_i$, is in the denominator and U is a convex function for $X_i \geq 0$. The convex optimization problem then becomes finding the minimum objective of U, as follows:

$$\min_X \sum_i U(X_i) = \min_X \sum_i \frac{W_i}{X_i},$$

subject to XA≤C, over $X_i \geq 0$. This convex optimization problem may be solved by defining its Lagrange multipliers:

$$L(x,\mu) = U(x) + \mu^T(c - xA),$$

where x is an element of X and c is an element of C. In a particular embodiment, bandwidth management application 105 may resolve the Karush-Kuhn-Tucker (KKT) conditions of:

$$\Delta U^T - \mu^T A = 0$$

$$\mu_j (C_j = X^* A_j) = 0 \text{ for } j \in J$$

$$X^* A < C, X^* \geq 0, \mu \geq 0.$$

The result of this optimization problem is then the optimal allocation $X^*$, where $X^* \in X$. Such an allocation ensures that uploads from the endpoints that begin at the same time will finish at the same time (i.e., that heavier tasks will get more resources allocated), which is fair in time consumed but not fair in bandwidth allocated to each endpoint. Of course, other utility functions may be used in alternative embodiments, such as utility functions defined using various endpoint properties such as connectivity time, priority, and other factors. The weights for different factors may even be specified by an administrator.

In another embodiment, bandwidth management application 105 may optimize bandwidth allocation to achieve max-min fairness of bandwidth, in which any attempt to increase the allocation of bandwidth to a link results in the decrease in the allocation to another link with an equal or smaller allocation. Under a max-min fairness scheme, two endpoints sharing a bandwidth bottleneck will share the bandwidth equally unless one of the endpoints cannot reach the equal bandwidth level. In one embodiment, bandwidth management application 105 may use a reverse BFS tree traversal technique to allocate bandwidth over logical topology 110. In such a reverse BFS tree traversal, logical topology 110 may be traversed using ordinary BFS to generate an array of tree nodes, and bandwidth management 105 may then iterate over the array elements and allocate bandwidth. For example, bandwidth management 105 may allocate bandwidth according to the following algorithm:

Algorithm 1:
Step 1: Define every link as a node of a tree
Step 2: Generate an array (or list) using breadth-first search of the tree
Step 3: Iterate the array from its tail to its head
  Step 3(a) If the array element is a leaf node of the tree, mark the element with its available bandwidth
  Step 3(b) If the array element is not a leaf node, sort all endpoints (leafs) bandwidth from its children, from the least to the greatest. Then divide the bandwidth with endpoint number from its children. If the children's endpoints bandwidth is less than the average, keep the value from the children and enlarge the remaining bandwidth, until the remaining bandwidth is larger than the bandwidth from the children.

Algorithm 1 would apply to logical topology 110 and the capacity of available bandwidths depicted in panel C as follows:

Step 1: The tree defined based on topology 110 has nine nodes: (a), (ba), (bb), (b), (ca), (cb), (cc), (c), and (r), where (b) is the parent of (ba) and (bb) and (c) is the parent of (ca), (cb), and (cc).
Step 2: Breadth-first search of the tree produces the following array: (r) (a) (b) (c) (ba) (bb) (ca) (cb) (cc)
Step 3: Iterating over the array from its tail to its head:
  Step 3(a) Mark leaf nodes as: (cc): 10, (cb): 2, (ca): 10, (bb): 8, (ba): 8, (a): 6.
  Step 3(b) In node (b), average bandwidth is 5 for (ba) and (bb). However, the bandwidth for the children (ba) and (bb) is 8 which is larger 5, so (ba) and (bb) need to be updated to 5. Similarly for node (c), update (ca), (cb), and (cc) to 1.3333. For (r), sort endpoints from its children as: (cc): 1.3333, (cb): 1.3333, (ca): 1.3333, (bb): 5, (ba): 5, (a): 6. The average bandwidth is 2. Because (ca), (cb), and (cc) are less than 2, keep them unchanged and enlarge the remaining bandwidth to 12−(1.3333*3)=8. Then, the average remaining bandwidth for other endpoints will be 2.6667, which is less than (a), (ba), and (bb). The result, which is shown in panel D, is then: (cc): 1.3333, (cb): 1.3333, (ca): 1.3333, (bb): 2.6667, (ba): 2.6667, and (a): 2.6667.

After obtaining the optimized bandwidth allocation, bandwidth management application 105 may take control actions based on the optimized allocation. Where the system's bandwidth consumption is controlled is a decision that may be made according to the nature of the system's architecture. For example, bandwidth management application 105 may throttle the uploading rate of one or more endpoints in one embodiment. In an alternative embodiment, the rate of traffic flows may be limited at a router or gateway.

Figure 2:
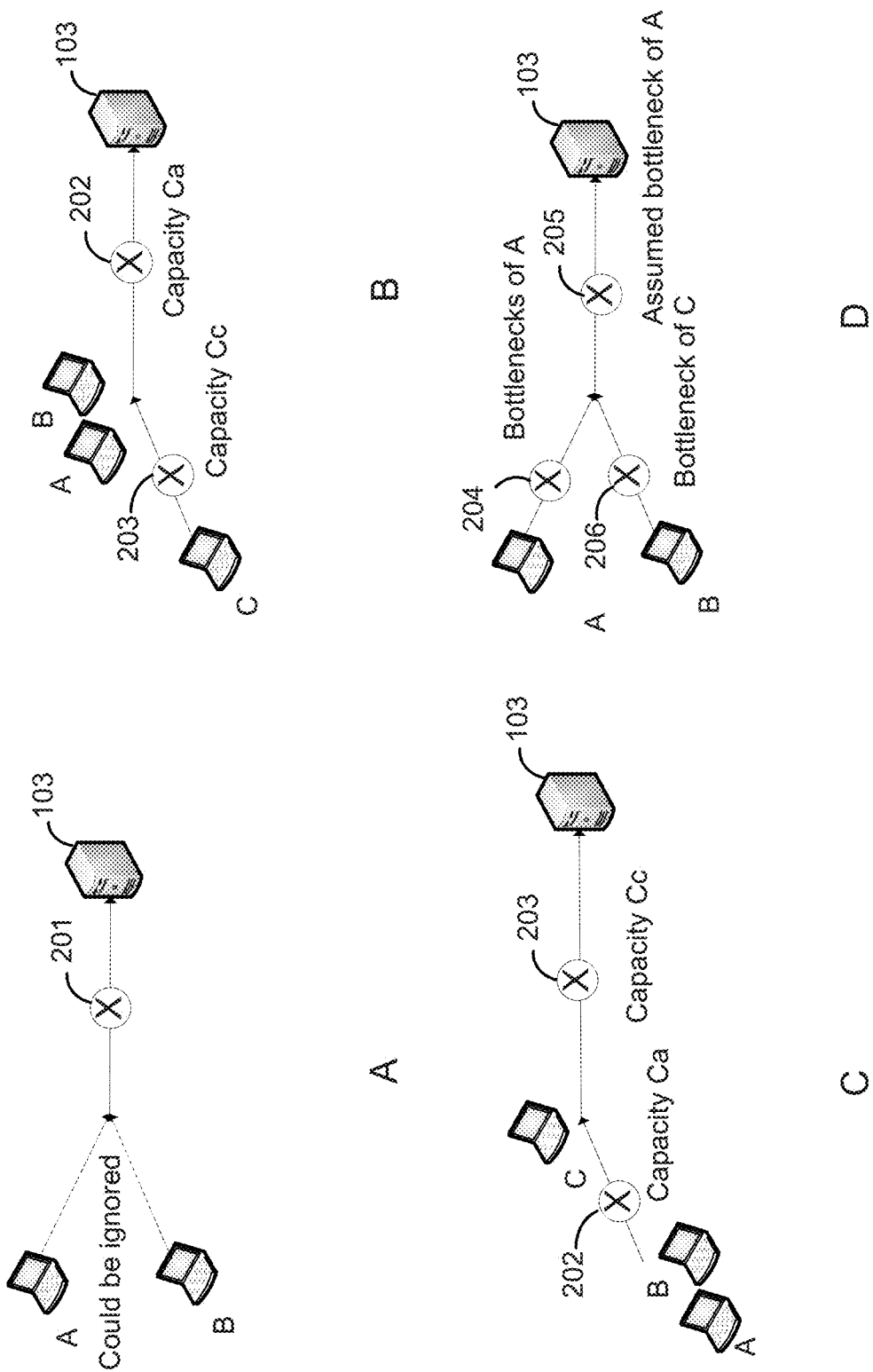
FIG. 2 illustrates example steps in generating a logical network topology, according to an embodiment.

FIG. 2 illustrates example steps in generating a logical network topology, according to an embodiment. Panel A shows a first example in which two flows A and B are determined to share a bottleneck 201. As discussed, bandwidth management application 105 may estimate the distribution of the traffic flows by counting the arrival times of each packet in the flows as packets are received and calculating mean, variance, and/or other stochastic attributes for the flows. If two traffic flows follow the same distribution during the same period of time, then bandwidth management application 105 may assume that those flows share the same bottleneck. In addition, the fact that the flows actually originate from different endpoints may be ignored (i.e., it may be assumed that they are the same endpoint).

Panel B shows a second example in which two traffic flows are determined to have different bottlenecks. In particular, the case of flow A being faster than flow C is shown. In this case, bandwidth management application 105 may determine, based on the stochastic attributes of the flows, that flow A is faster than flow C and that there are two bottlenecks 202 and 203 having capacities Ca and Cc, respectively. Note that each bottleneck forms a link in the logical topology.

Panel C shows the combination of the first and second examples, discussed above. That is, if flows A and B are determined to share a bottleneck, but flow C is determined to have a different bottleneck than flow A, bandwidth management application 105 may construct the logical topology depicted in panel C. As shown, this topology includes flows A-C, central server 103, as well as two bottlenecks 202-203 having capacities Ca and Cc, respectively.

Panel D shows the case in which the first example, discussed above, is combined with a determination that flow C is faster than flow A, which is the opposite of the second example discussed above. In such a case, bandwidth management application 105 may merge these results to generate a logical topology having two bottlenecks of A, namely bottlenecks 204 and 205, and one bottleneck of C, namely bottleneck 206, as depicted in panel D.

By repeating the steps of determining whether traffic flows share the same bottleneck and merging the results of such determinations, discussed above, bandwidth management application 105 may determine an overall logical topology of the network, an example of which is shown in FIG. 1. In alternative embodiments, other techniques may be used to generate network topologies.

Figure 3:
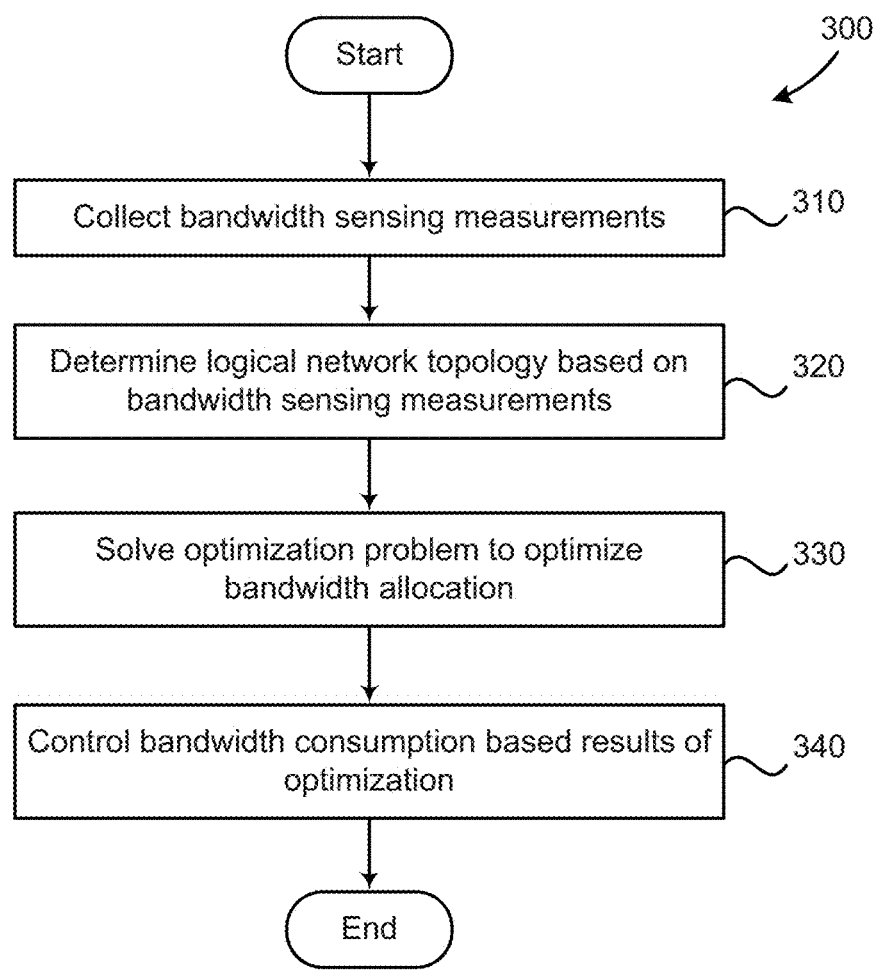
FIG. 3 illustrates a method for network bandwidth management, according to an embodiment.

FIG. 3 illustrates a method 300 for network bandwidth management, according to an embodiment. As shown, method 300 begins at step 310, where bandwidth management application 105 collects bandwidth sensing measurements. As discussed, bandwidth management application 105 executes in a central server that receives data uploads from multiple client devices. Sensing measurements may thus include measuring metrics in the network, either actively or passively. Active measurement refers to actively sending and receiving messages (packets), which may intrusively affect the network under detection. Passive measurement refers to measuring the network by silent observation, e.g., with a sniffer behind an optical splitter, getting NetFlow records from routers, etc. In one embodiment, bandwidth management application 105 may make passive network bandwidth measurements using the packets that are ordinarily uploaded by the endpoints. In particular, bandwidth management application 105 may measure metrics such as bandwidth, latency, packet size, and the like.

At step 320, bandwidth management application 105 determines the logical network topology based on the bandwidth sensing measurements. The logical network topology may be recalculated, e.g., each time an endpoint disconnects, at a regular interval, etc. Additionally, the logical topology may be cached/persisted and, e.g., if an endpoint re-connects with the same IP, it may be assumed that the topology hasn't changed. In general, the logical topology may be determined based on stochastic attributes of the traffic measured at step 310. In one embodiment, bandwidth management application 105 may (1) measure effective bandwidths for each endpoint, and (2) identify shared bottlenecks. For example, "Packet Bunch Modes" may be used to measure effective bandwidths of endpoints. Further, bandwidth management application 105 may compare traffic flows from each pair of endpoints to identify whether the flows have the same distribution, in which case bandwidth management application 105 may determine that the flows share a bottleneck. As discussed, bandwidth management application 105 may then merge the results of such determinations to build the overall logical topology.

At step 330, bandwidth management application 105 solves an optimization problem to optimize bandwidth allocation. The optimization problem may have as constraints the bandwidth capacity of the links in the logical topology. More generally, bottleneck bandwidth capacity, workload, connectivity, and time are some factors that, if known, may be used in the optimization.

Bandwidth allocation may be optimized in a number of different ways to achieve some desired combination of efficiency and/or fairness. In one embodiment, bandwidth management application 105 may solve a convex optimization problem to optimize the bandwidth allocation. For example, bandwidth management application 105 may minimize the objective function $$U(X_i) = \frac{W_i}{X_i},$$

discussed above. Other utility functions may be used in alternative embodiments, such as utility functions defined using various endpoint properties such as connectivity time, priority, and other factors. In another embodiment, bandwidth management application 105 may optimize bandwidth allocation to achieve max-min fairness of bandwidth by traversing the topology with a reverse BFS tree traversal algorithm and allocating bandwidth over the logical topology.

At step 340, bandwidth management application 105 controls bandwidth consumption based on results of the optimization. In one embodiment, bandwidth management application 105 may throttle the uploading rate of the endpoints. For example, bandwidth management application 105 may instruct each of the endpoints to use a respective portion of bandwidth, and in turn the endpoints may throttle their uploading according to the rates. Bandwidth control may also be achieved in other ways, such as by limiting the rate of traffic flows at a router or gateway. For example, algorithms such as the "leaky bucket" algorithm may be employed to limit the rate of traffic flows in the router or gateway based on rates communicated by bandwidth management application 105.

Figure 4:
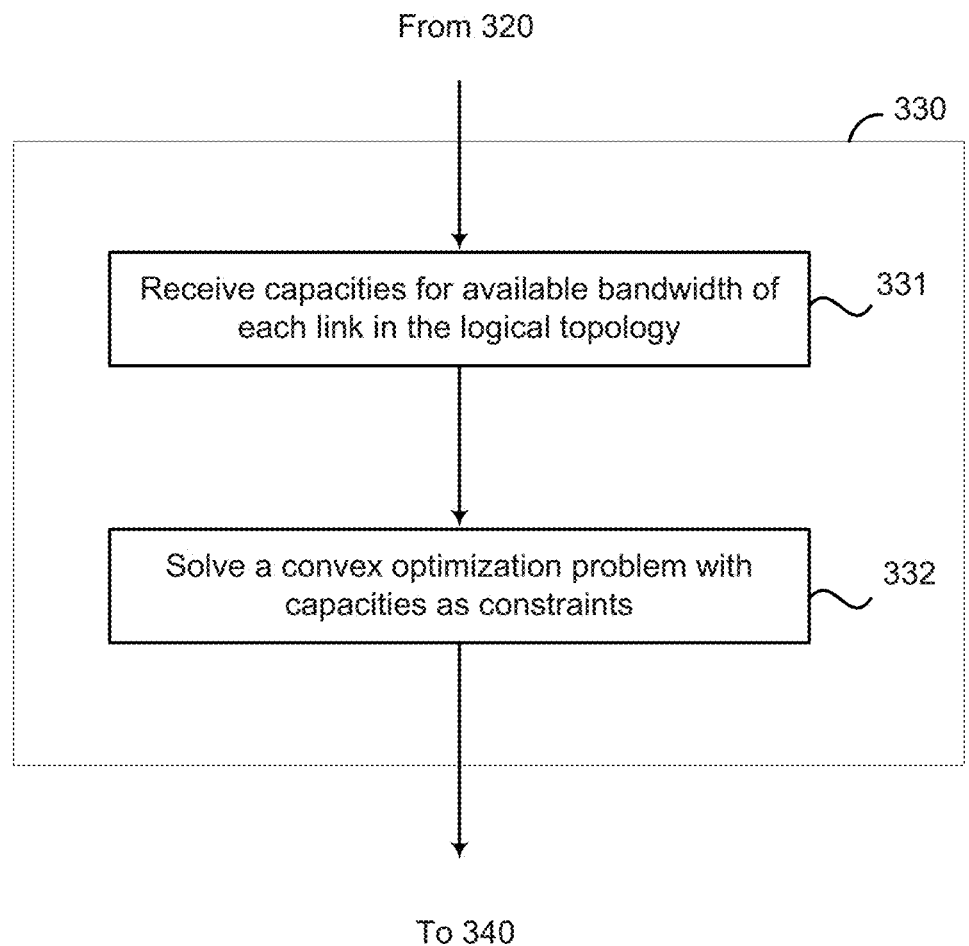
FIG. 4 illustrates a method for optimizing bandwidth allocation, according to an embodiment of the invention.

FIG. 4 illustrates a method for optimizing bandwidth allocation that further illustrates step 330 of FIG. 3, according to an embodiment. At step 331, bandwidth management application 105 receives capacities for available bandwidth of each link in the logical topology. The available bandwidths are designated herein as $C=\{C_1, C_2, \ldots, C_{[j]}\}$, where $C_j$ is the available bandwidth for link j, and may be obtained from network sensing measurements, discussed above.

At step 332, bandwidth management application 105 solves a convex optimization problem with the capacities as constraints. A utility function $U(X_i)$ may be defined for each flow i taking as input consumed bandwidth of traffic flow $X_i$, and the convex optimization problem then becomes finding the minimum objective of U: $\min_x \Sigma_i U(X_i)$, subject to $XA \leq C$, over $X_i \geq 0$. Here, the available bandwidths $C = \{C_1, C_2, \ldots, C_{[j]}\}$ are from step 331, and A is a 0-1 matrix having elements $A_{ij} = 1$ if a router r of an given endpoint i satisfies $j \in r$, where j is a link in the network, and $A_{ij} = 0$ otherwise.

In one embodiment, the utility function may be defined based on the notion of efficiency as:

$$U(X_i) = \frac{W_i}{X_i},$$

where $W_i$ is the total task workload for a given endpoint i. This utility function U is a convex function for $X_i \geq 0$, and the convex optimization problem then boils down to finding the minimum objective:

$$\min_X \sum_i U(X_i) = \min_X \sum_i \frac{W_i}{X_i},$$

subject to $XA \leq C$, over $X_i \geq 0$. One approach for solving this convex optimization problem involves defining its Lagrange multipliers:

$$L(x,\mu) = U(x) + \mu^T(c - xA),$$

where x is an element of X and c is an element of C. In a particular embodiment, bandwidth management application 105 may resolve the Karush-Kuhn-Tucker (KKT) conditions of:

$$\Delta U^T - \mu^T A = 0$$

$$\mu_j(C_j = X^* A_j) = 0 \text{ for } j \in J$$

$$X^* A < C, X^* \geq 0, \mu \geq 0.$$

The result of this optimization problem is then the optimal allocation $X^*$, where $X^* \in X$.

Figure 5:
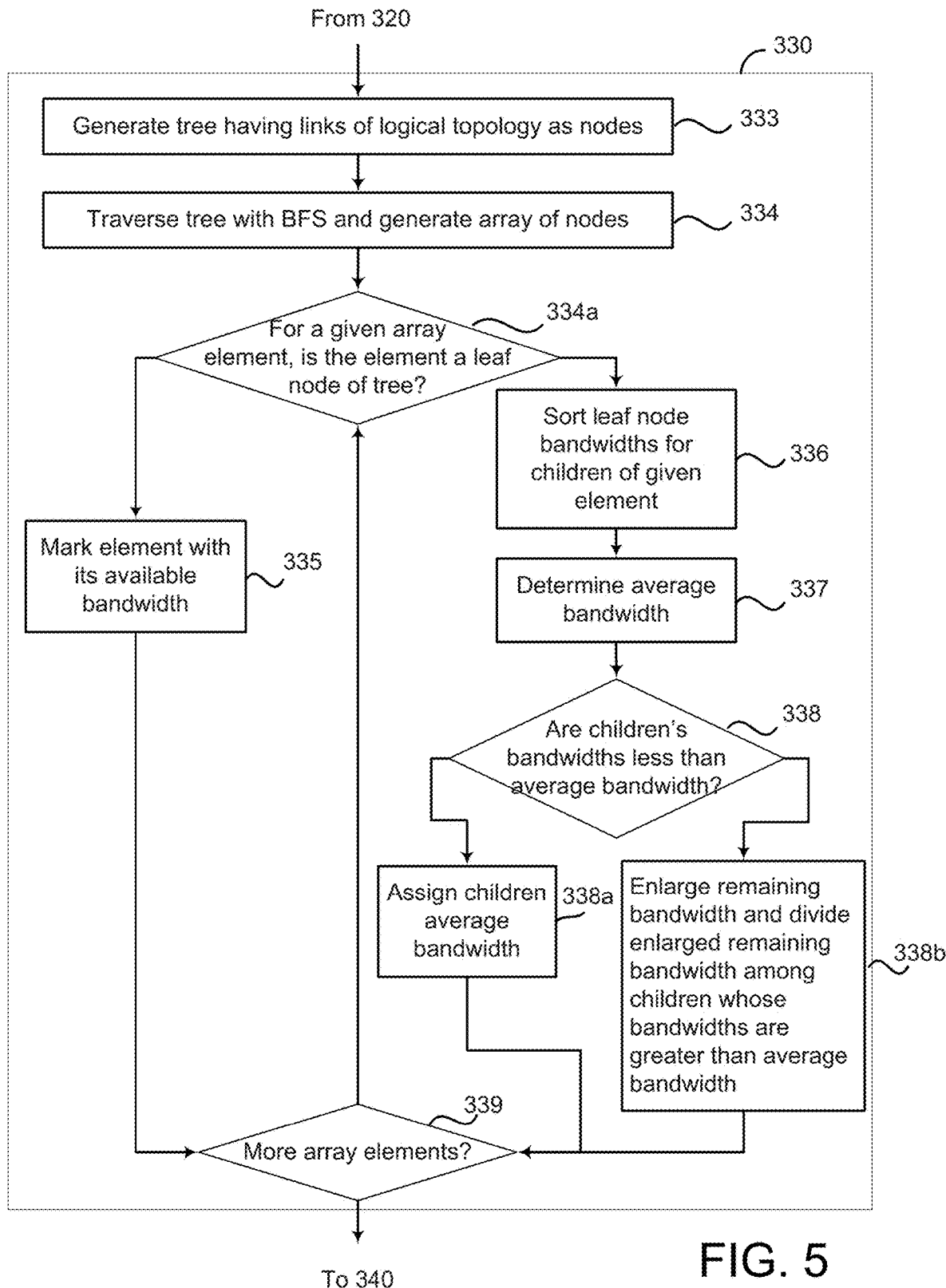
FIG. 5 illustrates a method for optimizing bandwidth allocation, according to an alternative embodiment.

FIG. 5 illustrates a method for optimizing bandwidth allocation that further illustrates step 330 of FIG. 3, according to an alternative embodiment. This alternative embodiment solves the reduced use case of fair bandwidth allocation using a reverse BFS tree traversal algorithm. At step 333, bandwidth management application 105 generates the tree having links of the logical network topology as nodes. That is, a tree data structure is used to store information on the logical network topology, with each tree node representing a link in the logical topology.

At step 334, bandwidth management application 105 traverses the tree with breadth-first search and generates an array of nodes during the traversal. It will be understood that BFS is a tree traversal algorithm in which each of a node's neighbors are visited first, and then child nodes and their neighbors are visited, etc. As bandwidth management application 105 traverses the tree with breadth-first search, an array may be populated with the nodes of the tree as they are visited during the tree traversal.

At step 334a, bandwidth management application 105 determines, for a given array element, whether the element is a leaf node of the tree. In one embodiment, bandwidth management application 105 may iterate over the array from head to tail and process each array element according to steps 335-338.

If the array element is determined to be a leaf node, then bandwidth management application 105 simply marks the element with its available bandwidth at step 335. If, however, the array element is not a leaf node, then bandwidth management application 105 sorts the leaf node bandwidths of children of the element at step 336.

Then at step 337, bandwidth management application 105 determines an average bandwidth if the available bandwidth capacity of the given array element were to be divided evenly among its children. Returning to the example discussed with respect to FIG. 1, node (b) in the tree representing logical topology 110 had average bandwidth of 5 for (ba) and (bb); node (c) had average bandwidth of 1.3333 for (ca), (cb), and (cc); and node (r) had average bandwidth of 2 for its children (cc), (cb), (ca), (bb), (ba), and (a).

At step 338, bandwidth management application 105 determines whether the children's bandwidths are less than the average bandwidth. If the children's bandwidths are not less than the average bandwidth, then those children are simply assigned the average bandwidth at step 338a.

However, if any of the children's bandwidths are less than the average bandwidth, bandwidth management application 105 enlarges the remaining bandwidth at step 338b and divides the enlarged remaining bandwidth equally among the children whose bandwidths are not less than the average bandwidth. Returning to the example discussed with respect to FIG. 1, the bandwidth capacity of (r) was 12 and the average bandwidth was 2 for its children (cc), (cb), (ca), (bb), (ba), and (a), but child nodes (ca), (cb), and (cc) had lesser bandwidths of 1.3333 each. In such a case, the remaining bandwidth may be enlarged to $12-(3*1.3333)=8$. This enlarged bandwidth may then be divided among the remaining three children, which would each be assigned 2.6667.

At step 339, bandwidth management application 105 determines whether there are more elements in the array. If there are more array elements, then method 300 returns to step 334a, where bandwidth management application 105 selects and processes another array element.

Figure 6:
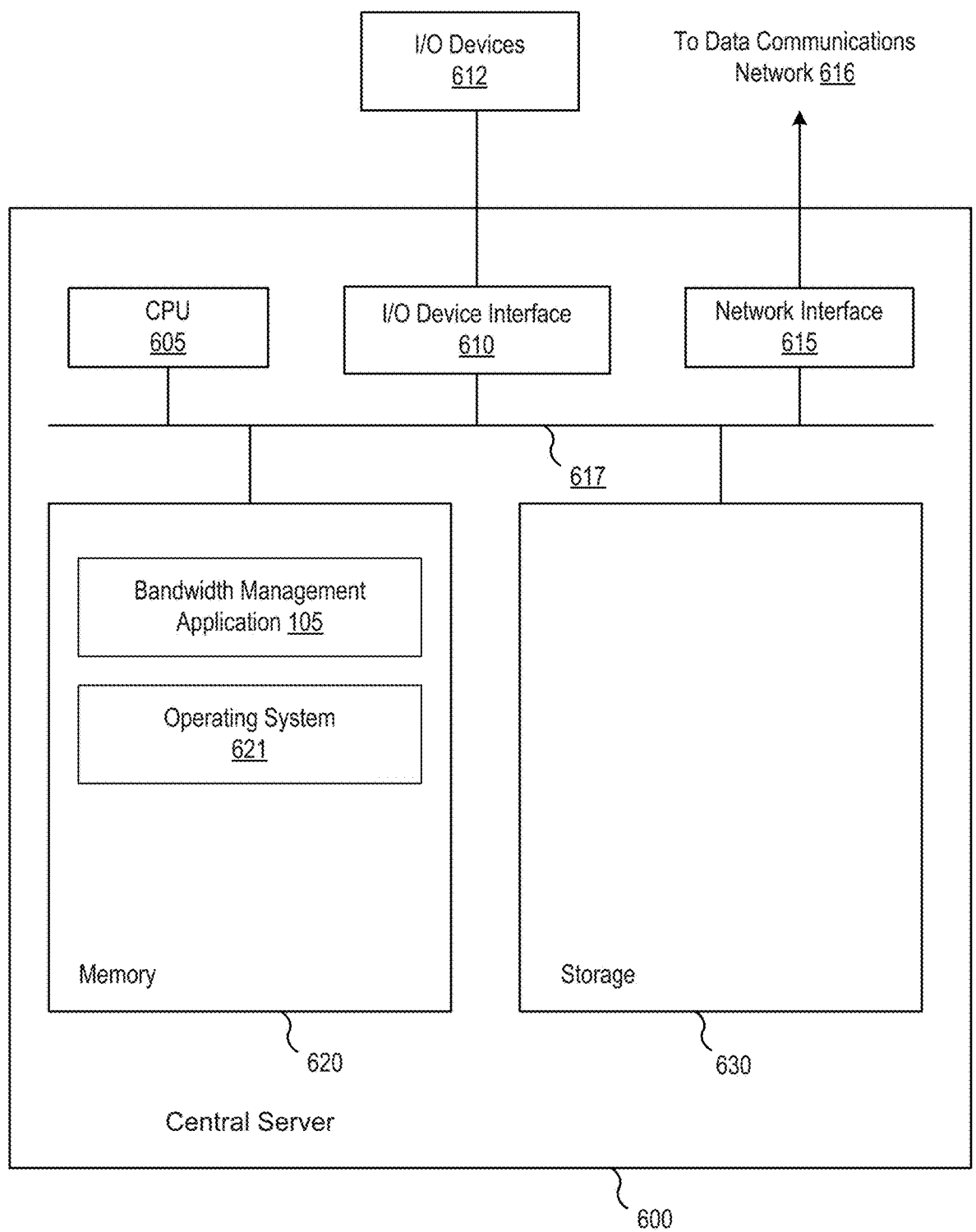
FIG. 6 illustrates a system on which an embodiment may be implemented.

FIG. 6 illustrates a computer system 600 on which an embodiment may be implemented. Computer system 600 can be used to implement central server 103, discussed above. As shown, computer system 600 includes, without limitation, a central processing unit (CPU) 605, a network interface 615 connecting the system to a network 616, an interconnect 617, a memory 620, and storage 630. Computer system 600 may also include an I/O device interface 610 connecting I/O devices 612 (e.g., keyboard, display and mouse devices) to the computer system 600.

CPU 605 retrieves and executes programming instructions stored in memory 620. Similarly, CPU 605 stores and retrieves application data residing in memory 620. The interconnect 617 facilitates transmission, such as of programming instructions and application data, between CPU 605, I/O device interface 610, storage 630, network interface 615, and memory 620. CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, although shown as a single computing system, one of ordinary skill in the art will recognized that the components of the computer system 600 shown in FIG. 4 may be distributed across multiple computing systems connected by a data communications network.

As shown, the memory 620 includes an operating system 621 and bandwidth management application 105. Illustratively, the operating system 621 may be Linux® or the like type operating system. Bandwidth management application 622 is configured to manage network bandwidth allocation in a distributed system with a point of convergence. In one embodiment, bandwidth management application 662 may collect network measurements, determine a logical network topology based on the measurements, solve an optimization problem to optimize bandwidth allocation, and control bandwidth consumption based on the bandwidth allocation, according to method 300, discussed above with respect to FIGS. 3-5.

Advantageously, techniques disclosed herein provide optimization of bandwidth allocation in a distributed system where large upstream transfers are made from endpoints to a central server. Unlike prior approaches in which endpoints made bandwidth decisions individually, techniques disclosed herein calculate, at a central server, the ideal bandwidth for each endpoint to achieve maximum throughput at the server side. A global maximum throughput may thus be achieved.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method for optimizing network bandwidth allocation in a distributed system having multiple endpoints that upload data to a central server or server cluster, the method comprising:
    receiving a logical topology of the network that is determined based on network measurements;
    storing links of the logical topology in nodes of a tree data structure (tree);
    allocating bandwidths for the endpoints that upload data during a traversal of the nodes of the tree, wherein the allocating includes:
        for each leaf node of the tree corresponding to a respective link of the logical topology that is connected to one of the endpoints that upload data, assigning the one of the endpoints an available bandwidth of the leaf node, and
        subsequent to assigning the available bandwidth of the leaf node for each leaf node of the tree, for each node of the nodes of the tree that are not leaf nodes:
            determining an average bandwidth by dividing a bandwidth capacity of the node evenly among all endpoints connected to leaf children nodes of the node;

keeping previously assigned bandwidths of any of the endpoints that are connected to leaf children nodes of the node and that were previously assigned bandwidths less than the average bandwidth;

determining a remaining bandwidth by subtracting, from the bandwidth capacity of the node, the previously assigned bandwidths that are kept;

determining an average remaining bandwidth by dividing the remaining bandwidth evenly among each of the endpoints that are connected to leaf children nodes of the node and that were previously assigned bandwidths not less than the average bandwidth; and assigning the average remaining bandwidth to each endpoint of the endpoints that are connected to leaf children nodes of the node and that were previously assigned bandwidths not less than the average bandwidth if the average remaining bandwidth is less than a previously assigned bandwidth of the endpoint; and controlling bandwidth consumption by the endpoints that upload data based on the bandwidths allocated for the endpoints that upload data.

2. The method of claim 1, wherein the bandwidths allocated for the endpoints satisfy max-min fairness of bandwidth.

3. The method of claim 1, wherein during the traversal of the nodes of the tree:

an array is generated storing the nodes of the tree identified via a breadth-first search (BFS) traversal of the tree;

elements of the array are iteratively processed from a tail of the array to a head of the array; and for each element of the array that is not a leaf node of the tree, bandwidths associated with endpoints connected to leaf children nodes of the element are sorted.

4. The method of claim 1, wherein the bandwidth consumption is controlled by at least one of throttling uploading rates at the endpoints or limiting rate of traffic flows at routers.

5. The method of claim 1, wherein the network measurements are passively collected based on packets transmitted by the endpoints to the central server or server cluster.

6. The method of claim 1, wherein the logical topology is determined by comparing the network measurements of each pair of the endpoints to identify whether the pair of endpoints shares a bottleneck.

7. The method of claim 1, wherein the logical topology is a unidirectional tree topology.

8. A non-transitory computer-readable storage medium embodying computer program instructions for managing network bandwidth in a distributed system having multiple endpoints that upload data to a central server or server cluster, the computer program instructions implementing operations comprising:

receiving a logical topology of the network that is determined based on network measurements;

storing links of the logical topology in nodes of a tree data structure (tree);

allocating bandwidths for the endpoints that upload data during a traversal of the nodes of the tree, wherein the allocating includes:

for each leaf node of the tree corresponding to a respective link of the logical topology that is connected to one of the endpoints that upload data, assigning the one of the endpoints an available bandwidth of the leaf node, and subsequent to assigning the available bandwidth of the leaf node for each leaf node of the tree, for each node of the nodes of the tree that are not leaf nodes:

determining an average bandwidth by dividing a bandwidth capacity of the node evenly among all endpoints connected to leaf children nodes of the node;

keeping previously assigned bandwidths of any of the endpoints that are connected to leaf children nodes of the node and that were previously assigned bandwidths less than the average bandwidth;

determining a remaining bandwidth by subtracting, from the bandwidth capacity of the node, the previously assigned bandwidths that are kept;

determining an average remaining bandwidth by dividing the remaining bandwidth evenly among each of the endpoints that are connected to leaf children nodes of the node and that were previously assigned bandwidths not less than the average bandwidth; and assigning the average remaining bandwidth to each endpoint of the endpoints that are connected to leaf children nodes of the node and that were previously assigned bandwidths not less than the average bandwidth if the average remaining bandwidth is less than a previously assigned bandwidth of the endpoint; and controlling bandwidth consumption by the endpoints that upload data based on the bandwidths allocated for the endpoints that upload data.

9. The non-transitory computer-readable storage medium of claim 8, wherein the bandwidths allocated for the endpoints satisfy max-min fairness of bandwidth.

10. The non-transitory computer-readable storage medium of claim 8, wherein during the traversal of the nodes of the tree:

an array is generated storing the nodes of the tree identified via a breadth-first search (BFS) traversal of the tree;

elements of the array are iteratively processed from a tail of the array to a head of the array; and for each element of the array that is not a leaf node of the tree, bandwidths associated with endpoints connected to leaf children nodes of the element are sorted.

11. The non-transitory computer-readable storage medium of claim 8, wherein the bandwidth consumption is controlled by at least one of throttling uploading rates at the endpoints or limiting rate of traffic flows at routers.

12. The non-transitory computer-readable storage medium of claim 8, wherein the network measurements are passively collected based on packets transmitted by the endpoints to the central server or server cluster.

13. The non-transitory computer-readable storage medium of claim 8, wherein the logical topology is determined by comparing the network measurements of each pair of the endpoints to identify whether the pair of endpoints shares a bottleneck.

14. The non-transitory computer-readable storage medium of claim 8, wherein the logical topology is a unidirectional tree topology.

15. A system, comprising:

a processor; and a memory, wherein the memory includes a program configured for execution by the processor to perform operations for managing network bandwidth in a distributed system having multiple endpoints that upload data to a central server or server cluster, the operations comprising:

receiving a logical topology of the network that is determined based on network measurements, storing links of the logical topology in nodes of a tree data structure (tree), allocating bandwidths for the endpoints that upload data during a traversal of the nodes of the tree, wherein the allocating includes:

for each leaf node of the tree corresponding to a respective link of the logical topology that is connected to one of the endpoints that upload data, assigning the one of the endpoints an available bandwidth of the leaf node; and subsequent to assigning the available bandwidth of the leaf node for each leaf node of the tree, for each node of the nodes of the tree that are not leaf nodes:

determining an average bandwidth by dividing a bandwidth capacity of the node evenly among all endpoints connected to leaf children nodes of the node, keeping previously assigned bandwidths of any of the endpoints that are connected to leaf children nodes of the node and that were previously assigned bandwidths less than the average bandwidth, determining a remaining bandwidth by subtracting, from the bandwidth capacity of the node, the previously assigned bandwidths that are kept, determining an average remaining bandwidth by dividing the remaining bandwidth evenly among each of the endpoints that are connected to leaf children nodes of the node and that were previously assigned bandwidths not less than the average bandwidth, and assigning the average remaining bandwidth to each endpoint of the endpoints that are connected to leaf children nodes of the node and that were previously assigned bandwidths not less than the average bandwidth if the average remaining bandwidth is less than a previously assigned bandwidth of the endpoint, and controlling bandwidth consumption by the endpoints that upload data based on the bandwidths allocated for the endpoints that upload data.

16. The system of claim 15, wherein the bandwidths allocated for the endpoints satisfy max-min fairness of bandwidth.

17. The system of claim 15, wherein during the traversal of the nodes of the tree:

an array is generated storing the nodes of the tree identified via a breadth-first search (BFS) traversal of the tree;

elements of the array are iteratively processed from a tail of the array to a head of the array; and for each element of the array that is not a leaf node of the tree, bandwidths associated with endpoints connected to leaf children nodes of the element are sorted.

\* \* \* \* \*

UNITED STATES PATENT AND TRADEMARK OFFICE
CERTIFICATE OF CORRECTION

PATENT NO. : 10,608,955 B2
APPLICATION NO. : 14/553377
DATED : March 31, 2020
INVENTOR(S) : Lu et al.

Page 1 of 1

It is certified that error appears in the above-identified patent and that said Letters Patent is hereby corrected as shown below:

In the Specification

Column 1, Line 14 reads:
[[14/535,306]]
Should read:
14/553,306

Column 5, Line 45 reads:
[[$\Delta U^T - \mu^T A = 0$]]
Should read:
$\nabla U^T - \mu^T A = 0$ Column 9, Line 35 reads:
[[$\Delta U^T - \mu^T A = 0$]]
Should read:
$\nabla U^T - \mu^T A = 0$ Signed and Sealed this
Fifteenth Day of September, 2020

Andrei Iancu
*Director of the United States Patent and Trademark Office*